(12) United States Patent
Alvarez Valenzuela et al.

(10) Patent No.: US 12,009,738 B2
(45) Date of Patent: Jun. 11, 2024

(54) ASSEMBLY HAVING A MULTILEVEL POWER CONVERTER

(71) Applicant: Siemens Energy Global GmbH & Co. KG, Munich (DE)

(72) Inventors: Rodrigo Alonso Alvarez Valenzuela, Nuremberg (DE); Sebastian Semmler, Nuremberg (DE)

(73) Assignee: Siemens Energy Global GmbH & Co. KG, Erlangen (DE)

( * ) Notice: Subject to any disclaimer, the term of this patent is extended or adjusted under 35 U.S.C. 154(b) by 260 days.

(21) Appl. No.: 17/611,255

(22) PCT Filed: May 15, 2019

(86) PCT No.: PCT/EP2019/062505
§ 371 (c)(1),
(2) Date: Nov. 15, 2021

(87) PCT Pub. No.: WO2020/228951
PCT Pub. Date: Nov. 19, 2020

(65) Prior Publication Data
US 2022/0231612 A1 Jul. 21, 2022

(51) Int. Cl.
*H02M 1/32* (2007.01)
*H02M 7/12* (2006.01)
(Continued)

(52) U.S. Cl.
CPC ............... *H02M 1/32* (2013.01); *H02M 7/12* (2013.01); *H02M 7/4835* (2021.05); *H02M 7/7575* (2013.01); *H02J 3/36* (2013.01)

(58) Field of Classification Search
CPC ........ H02M 1/32; H02M 7/12; H02M 7/4835; H02M 7/7575
See application file for complete search history.

(56) References Cited

U.S. PATENT DOCUMENTS

2019/0068076 A1* 2/2019 Uda ...................... H02M 7/483

FOREIGN PATENT DOCUMENTS

| CN | 106100404 A | 11/2016 |
| CN | 106953347 A | 7/2017 |

(Continued)

OTHER PUBLICATIONS

Tuennerhoff P. et al: "Fault analysis of HVDC systems with partial underground cabling", 13$^{th}$ IET International Conference on AC and DC Power Transmission (ACDC 2017), pp. 19 (6.)-19 (6.), XP055626906, DOI: 10.1049/cp.2017.0019; ISBN: 978-1-78561-421-7; pp. 3-4; Abstract; Figures 3; 2017.

*Primary Examiner* — Jue Zhang
(74) *Attorney, Agent, or Firm* — Laurence A. Greenberg; Werner H. Stemer; Ralph E. Locher

(57) ABSTRACT

An assembly having a multilevel power converter, which has at least one phase module, wherein the phase module has a plurality of modules, each with a first electrical module terminal and a second electrical module terminal. The plurality of modules includes modules of a first type, which are able to output a voltage of only one polarity or zero voltage at their first electrical module terminal and their second electrical module terminal. The plurality of modules includes modules of a second type, which are able to output a voltage of one polarity, a voltage of opposite polarity or zero voltage at their first electrical module terminal and their second electrical module terminal. Depending on the polarity of a voltage across the modules of the second type, a voltage limiting device limits the voltage.

21 Claims, 6 Drawing Sheets

(51) Int. Cl.
*H02M 7/483* (2007.01)
*H02M 7/757* (2006.01)
*H02J 3/36* (2006.01)

(56) References Cited

FOREIGN PATENT DOCUMENTS

| | | | | |
|---|---|---|---|---|
| CN | 106953509 | A | 7/2017 | |
| CN | 208738855 | U | 4/2019 | |
| EP | 3068008 | A1 | 9/2016 | |
| EP | 3713074 | A1 * | 9/2020 | .............. H02M 1/32 |

* cited by examiner

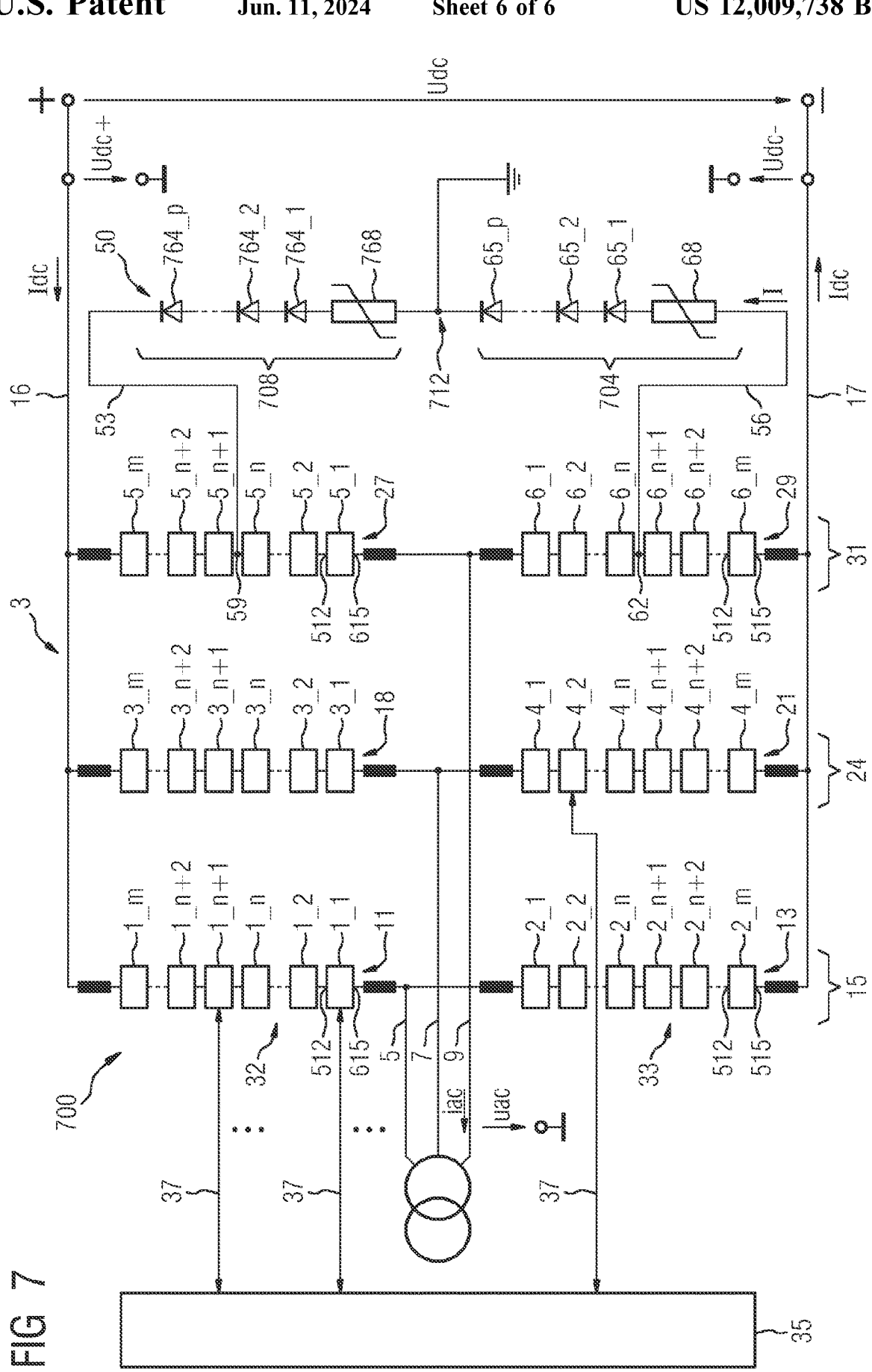

ASSEMBLY HAVING A MULTILEVEL POWER CONVERTER

FIELD AND BACKGROUND OF THE INVENTION

The invention relates to an assembly having a multilevel power converter comprising at least one phase module, wherein the phase module comprises a plurality of modules, each comprising a first electrical module terminal and a second electrical module terminal. Furthermore, the application relates to a method for polarity-dependent limiting of a voltage occurring at such a multilevel power converter.

During the operation of a multilevel power converter, temporary oscillations of the DC voltage can occur (for example owing to a fault or a singular event at a direct-current transmission link connected to the multilevel power converter). On account of these voltage oscillations, it can happen that high negative voltages occur at the DC voltage terminals of the multilevel power converter. Such high negative voltages can occur particularly if the direct-current transmission link comprises different conductor types, for example if the direct-current transmission link consists partly of a cable and partly of an overhead line. Particularly high negative voltages can then occur as a result of reflections between the different conductor types. "Negative voltage" here is understood to mean a voltage having a polarity opposite to the polarity of the voltage present at the first DC voltage terminal and the second DC voltage terminal of the multilevel power converter during normal operation ("positive voltage").

In order to cope with such undesired negative voltages, it is conceivable to increase the number of modules of the modular multilevel power converter in order that the latter can take up the voltages that occur, without the individual modules being overloaded. However, increasing the number of modules in this way is complex and cost-intensive. In particular, (more) bipolar modules such as full-bridge modules, for example, could also be used, which would likewise result in higher costs.

SUMMARY OF THE INVENTION

The invention is based on the object of specifying an assembly and a method which make it possible to cope with the negative voltages that temporarily occur, without the number of modules of the multilevel power converter having to be increased.

This object is achieved according to the invention by means of an assembly and a method as claimed in the independent patent claims. Advantageous embodiments of the assembly and of the method are specified in the dependent patent claims.

An assembly having a multilevel power converter comprising at least one phase module is disclosed, wherein the phase module comprises a plurality of modules, each comprising a first electrical module terminal and a second electrical module terminal. The plurality of modules comprises modules of a first type, which are able to output a voltage of exclusively one polarity or zero voltage at their first electrical module terminal and their second electrical module terminal. The plurality of modules comprises modules of a second type, which are able to output a voltage of one polarity, a voltage of opposite polarity or zero voltage at their first electrical module terminal and their second electrical module terminal. The assembly furthermore comprises a voltage limiting device, which limits a voltage (total voltage) that occurs across the modules of the second type depending on the polarity of said voltage.

The voltage limiting device thus carries out polarity-dependent voltage limiting. In this case, it is advantageous that the voltage limiting device limits the voltage that occurs across the modules of the second type depending on the polarity of said voltage. In this case, the polarity of the voltage that occurs across the modules of the second type is equal to the polarity of the voltage that occurs between a first DC voltage terminal and a second DC voltage terminal of the multilevel power converter. With this voltage limiting device, therefore, it is advantageously possible for only the undesired negative voltage to be limited, but the positive voltage that occurs during normal operation between the first and second DC voltage terminals is not limited. The voltage limiting device can bridge in particular the modules of the second type. To put it another way, the voltage limiting device can be connected in parallel with the modules of the second type.

The assembly can be configured such that
  the phase module comprises an AC voltage terminal, a first DC voltage terminal and a second DC voltage terminal. The multilevel power converter is then in particular an inverter or a rectifier.
The assembly can be configured such that
  the modules of the second type are arranged adjacent to the AC voltage terminal of the phase module, and the modules of the first type are arranged adjacent to the first DC voltage terminal and/or the second DC voltage terminal of the phase module. This results in a series circuit formed by modules of the second type which is adjacent to the AC voltage terminal.
The assembly can also be configured such that
  the modules each comprise at least one first electronic switching element, a second electronic switching element and an electrical energy store.
The assembly can be configured such that
  the modules of the first type each comprise the first electronic switching element and the second electronic switching element in a half-bridge circuit.
The assembly can also be configured such that
  the modules of the first type comprise, connected in parallel with the second electronic switching element, an additional semiconductor valve, in particular a diode, a thyristor, an IGCT or a GTO.
Said additional semiconductor valve is connected in particular between the first electrical module terminal and the second electrical module terminal. The additional semiconductor valve is connected in particular in the same direction as and in parallel with a diode connected in antiparallel with the second electronic switching element. The additional semiconductor valve serves for relieving the load on the diode connected in antiparallel with the second electronic switching element.
The assembly can be configured such that
  the modules of the second type each comprise the first electronic switching element, the second electronic switching element, a third electronic switching element and a fourth electronic switching element in a full-bridge circuit.
The voltage limiting device can be configured such that it limits only a voltage of one polarity that occurs across the modules of the second type, and in particular leaves substantially unchanged a voltage of the opposite polarity that occurs across the modules of the second type. That is to say, the voltage limiting device then limits exclusively voltages of one polarity that occur across the modules of the second type, and leaves substantially unchanged in particular voltages of the opposite polarity that occur across the modules of the second type.

Therefore, the voltage limiting device thus also limits exclusively voltages of one polarity that occur between the first DC voltage terminal and the second DC voltage terminal, and leaves substantially unchanged in particular voltages of the opposite polarity that occur between the first DC voltage terminal and the second DC voltage terminal. The "voltage of one polarity" is thus the undesired negative voltage; the "voltage of opposite polarity" is the (desired) positive voltage that occurs during normal operation of the power converter.

The voltage limiting device can be configured such that a current flows through the voltage limiting device (and thereby limits the voltage of said one polarity) only when the voltage of said one polarity occurs across the modules of the second type.

The voltage limiting device can thus be configured such that a current flows through the voltage limiting device (and thereby limits the voltage of said one polarity) only if the voltage of said one polarity occurs between the first DC voltage terminal and the second DC voltage terminal. The current that flows through the voltage limiting device results in the voltage of said one polarity being loaded or (wholly or partly) short-circuited and thereby limited.

The assembly can also be configured such that the voltage limiting device comprises at least one semiconductor valve, in particular a series circuit formed by semiconductor valves. The polarity dependence of the voltage limiting is realized by the semiconductor valve. In this case, the semiconductor valve can be an uncontrolled semiconductor valve (for example a diode) or a semiconductor valve capable of being switched on (for example a thyristor or a transistor).

The assembly can be configured such that the series circuit comprises at least 50 semiconductor valves. By means of this comparatively large number of semiconductor valves, it is advantageously possible to realize a high reverse voltage in order that the (desired) voltage of the opposite polarity remains substantially unchanged.

The assembly can be configured such that the semiconductor valve is a diode, a thyristor or a transistor. In particular, the diode can be a power diode (for example a diode configured as a disk-type thyristor); the thyristor can be a power thyristor (for example a thyristor configured as a disk-type thyristor). The semiconductor valve can be configured for example as an integrated gate-commutated thyristor (IGCT), a gate turn-off thyristor (GTO thyristor), an insulated-gate bipolar transistor (IGBT) or as a metal-oxide-semiconductor field-effect transistor (MOSFET).

The assembly can also be configured such that an electrical resistor is connected in series with the at least one semiconductor valve. The current flowing through the voltage limiting device can advantageously be limited by the electrical resistor. Moreover, the electrical energy stored in the direct-current transmission link can be converted into heat at the electrical resistor (in the case of a fault).

In this case, the assembly can be configured such that the electrical resistor is a varistor (voltage-dependent resistor), in particular a metal oxide varistor. By way of example, a surge arrester can be used as varistor. What can be achieved by means of such a surge arrester by virtue of an appropriate choice of the response voltage/threshold voltage is that the voltage limiting commences only upon a specific magnitude of the (undesired) voltage of said one polarity.

The assembly can also be configured such that the first DC voltage terminal and the second DC voltage terminal are connected to a direct-current transmission link, in particular a high-voltage direct-current transmission link, wherein the direct-current transmission link comprises two different conductor types, which differ with regard to their electrical capacitance per unit length ("mixed direct-current transmission link"). The voltage limiting device can be used particularly advantageously in the case of direct-current transmission links of this type because with two different conductor types particularly high undesired negative voltages can occur at the DC voltage terminals of the multilevel power converter.

In this case, the assembly can be configured such that the different conductor types are an overhead line, a cable and/or a gas-insulated line. The cable can be a high-voltage cable, in particular. In this case, for example, a cable has a higher electrical capacitance per unit length than an overhead line. As a further example, a gas-insulated line has a higher electrical capacitance per unit length than an overhead line.

The assembly can also be configured such that the cable is a plastic-insulated cable, an oil-insulated cable or a mass-impregnated cable. In particular, the direct-current transmission link can comprise an overhead line and a cable (in particular a plastic-insulated cable, an oil-insulated cable or a mass-impregnated cable).

The assembly can also be configured such that the phase module comprises modules of the first type and modules of the second type, at least some modules of which are electrically connected in series.

The assembly can be configured such that the multilevel power converter comprises 2 or 3 phase modules. These phase modules can be connected in parallel at their first DC voltage terminal and second DC voltage terminal. The multilevel power converter can thus also be used in two-phase or three-phase power supply systems. In this case, in particular, the voltage limiting device (that is to say a single voltage limiting device) can be switchable between the phase modules. Alternatively, a dedicated voltage limiting device can in each case be assigned (fixedly) to at least one of the phase modules. That is to say that one phase module, two phase modules or all three phase modules can have or be assigned in each case a (dedicated) voltage limiting device.

The assembly can be configured such that the voltage limiting device comprises a first series circuit formed by the at least one semiconductor valve (or the semiconductor valves) and the electrical resistor and a second series circuit formed by at least one further semiconductor valve (or further semiconductor valves) and a further electrical resistor. The connection point (center connection point)/the connection location between the first series circuit and the second series circuit is grounded. The opposite terminal of the first series circuit with respect to said connection point (center connection point) is electrically connected to a first connection point between the modules of the first type and the modules of the second type (in one phase module branch of the phase module); the opposite terminal of the second series circuit with respect to the connection point (center connection point) is electrically connected to a second connection point between the modules of the first type and the modules of the second type (in the other phase module branch of the phase module). The semiconductor valves and the resistors can be configured as specified above and in the exemplary embodiments. This assembly can be used in particular in the case of a symmetric monopole configuration of a high-voltage direct-current transmission installation.

Furthermore, a high-voltage direct-current transmission installation comprising an assembly according to any of the variants described above is disclosed.

Furthermore, there is disclosed a method for polarity-dependent limiting of a voltage in the case of a multilevel power converter comprising at least one phase module, wherein the phase module comprises a plurality of modules (1_1 ... 2_n), each comprising a first electrical module terminal and a second electrical module terminal, the plurality of modules comprises modules of a first type, which are able to output a voltage of exclusively one polarity or zero voltage at their first electrical module terminal and their second electrical module terminal, the plurality of modules comprises modules of a second type, which are able to output a voltage of one polarity, a voltage of opposite polarity or zero voltage at their first electrical module terminal and their second electrical module terminal, wherein in the method with a voltage limiting device only a voltage of one polarity that occurs across the modules of the second type is limited and, in particular, a voltage of the opposite polarity that occurs across the modules of the second type is left substantially unchanged.

In particular, a voltage that occurs across the modules of the first type is also left substantially unchanged (by the voltage limiting device). The voltage limiting device can bridge the modules of the second type. To put it another way, the voltage limiting device can be connected in parallel with the modules of the second type. The phase module can comprise an AC voltage terminal, a first DC voltage terminal and a second DC voltage terminal. At least some modules of the plurality of modules can be electrically connected in series.

The method can be configured such that it is only when the voltage of said one polarity occurs across the modules of the second type that a current flows through the voltage limiting device and the voltage of said one polarity is thereby limited.

Therefore, this method is then configured such that it is only when the voltage of said one polarity occurs between the first DC voltage terminal and the second DC voltage terminal that a current flows through the voltage limiting device and the voltage of said one polarity is thereby limited.

The method can proceed such that the modules of the first type each comprise a first electronic switching element and a second electronic switching element in a half-bridge circuit, wherein an additional semiconductor valve is arranged in a manner connected in parallel with the second electronic switching element, and a part of the current flowing through the modules of the first type will flow or is conducted through the additional semiconductor valve only when the voltage of said one polarity occurs across the modules of the second type. In particular, the majority of the current flowing through the modules of the first type can then be conducted through the additional semiconductor valve.

The assembly described and the method described have identical advantages or advantages of identical type.

The invention will be explained in greater detail below on the basis of exemplary embodiments. In this case, identical reference signs refer to identical or identically acting elements. To that end

BRIEF DESCRIPTION OF THE FIGURES

FIG. 7 illustrates a further exemplary embodiment of a multilevel power converter having a voltage limiting device.

DETAILED DESCRIPTION OF THE INVENTION

Figure 1:
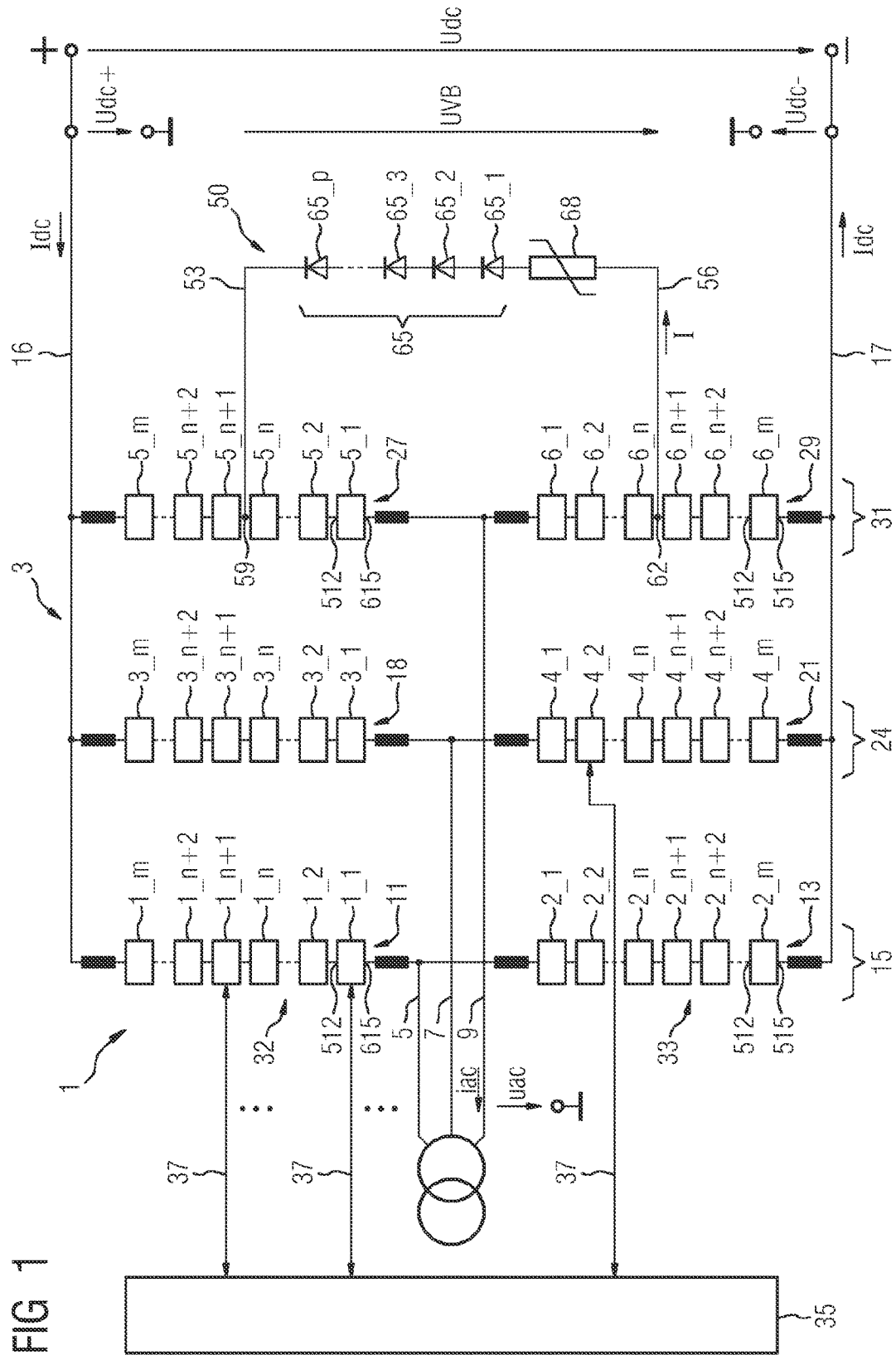
FIG. 1 illustrates one exemplary embodiment of a multilevel power converter having a voltage limiting device.

FIG. 1 illustrates one exemplary embodiment of an assembly 1 having a power converter 3 in the form of a modular multilevel power converter 3. Said multilevel power converter 3 comprises a first AC voltage terminal 5, a second AC voltage terminal 7 and a third AC voltage terminal 9. The first AC voltage terminal 5 is electrically connected to a first phase module branch 11 and a second phase module branch 13. The first phase module branch 11 and the second phase module branch 13 form a first phase module 15 of the power converter 3. That end of the first phase module branch 11 which is remote from the first AC voltage terminal 5 is electrically connected to a first DC voltage terminal 16; that end of the second phase module branch 13 which is remote from the first AC voltage terminal 5 is electrically connected to a second DC voltage terminal 17. The first DC voltage terminal 16 is a positive DC voltage terminal; the second DC voltage terminal 17 is a negative DC voltage terminal.

The second AC voltage terminal 7 is electrically connected to one end of a third phase module branch 18 and to one end of a fourth phase module branch 21. The third phase module branch 18 and the fourth phase module branch 21 form a second phase module 24. The third AC voltage terminal 9 is electrically connected to one end of a fifth phase module branch 27 and to one end of a sixth phase module branch 29. The fifth phase module branch 27 and the sixth phase module branch 29 form a third phase module 31.

That end of the third phase module branch 18 which is remote from the second AC voltage terminal 7 and that end of the fifth phase module branch 27 which is remote from the third AC voltage terminal 9 are electrically connected to the first DC voltage terminal 16. That end of the fourth phase module branch 21 which is remote from the second AC voltage terminal 7 and that end of the sixth phase module branch 29 which is remote from the third AC voltage terminal 9 are electrically connected to the second DC voltage terminal 17. The first phase module branch 11, the third phase module branch 18 and the fifth phase module branch 27 form a positive-side power converter part 32; the second phase module branch 13, the fourth phase module branch 21 and the sixth phase module branch 29 form a negative-side power converter part 33.

Each phase module branch comprises a plurality of modules (1_1, 1_2, 1_3, 1_4 ... 1_m; 2_1 ... 2_m; etc.), which are electrically connected in series (by means of their module terminals). Such modules are also referred to as submodules. In the exemplary embodiment in FIG. 1, each phase module branch comprises m modules. The number of modules electrically connected in series by means of their module terminals can be very different; at the very least, three modules are connected in series, but it is also possible for 50, 100 or more modules, for example, to be electrically connected in series. In the exemplary embodiment, m=36: the first phase module branch 11 thus comprises 36 modules 1_1, 1_2, 1_3, . . . 1_36. The other phase module branches 13, 18, 21, 27 and 29 are constructed in an identical way.

Figure 5:
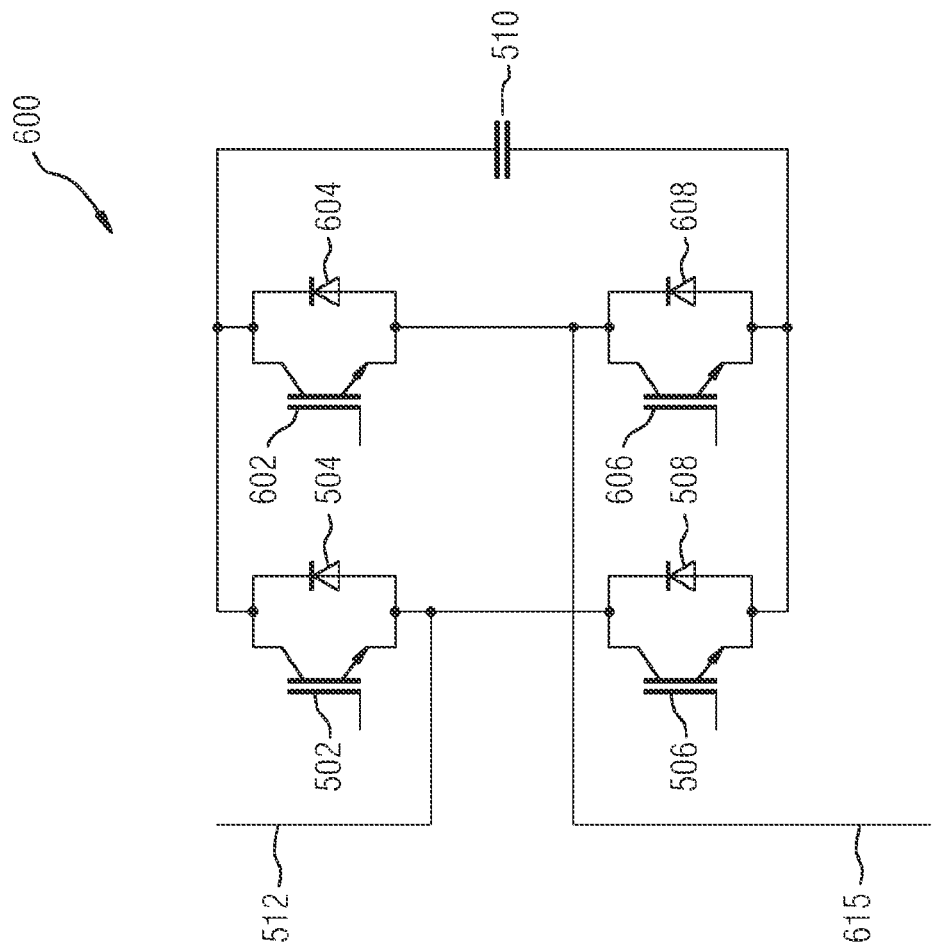
FIG. 5 illustrates one exemplary embodiment of a module of a first type of the multilevel power converter in the form of a half-bridge module.

Each phase module branch 11, 13, 18, 21, 27, 29 comprises modules of a first type and modules of a second type. Modules of the first type are modules which can output a voltage of exclusively one polarity or zero voltage between their first and their second electrical module terminal (depending on the driving of the modules). Modules of the first type are so-called half-bridge modules, for example, such as are illustrated in FIG. 5.

Figure 6:
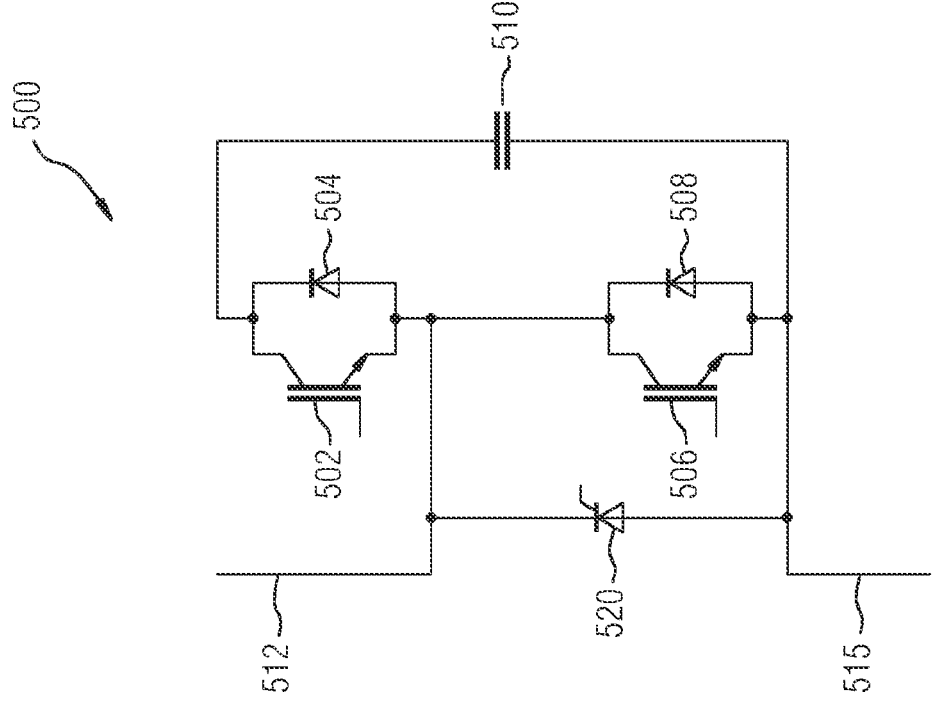
FIG. 6 illustrates one exemplary embodiment of a module of a second type of the multilevel power converter in the form of a full-bridge module.

Modules of the second type are modules which can output a voltage of one polarity, a voltage of opposite polarity or zero voltage between their first electrical module terminal and their second electrical module terminal (depending on the driving of the modules). Modules of the second type are so-called full-bridge modules, for example, such as are illustrated in FIG. 6.

Each phase module 15, 24, 31 comprises modules of the first type 500 and modules of the second type 600; each phase module thus comprises a plurality of modules. At least some modules of the first type and of the second type are electrically connected in series. At least some modules of the plurality of modules are thus electrically connected in series. Each phase module branch 11, 13, 18, 21, 27, 29 comprises n modules of the second type (modules 1_1 . . . 1_n; 2_1 . . . 2_n etc.). Furthermore, each phase module branch 11, 13, 18, 21, 27, 29 comprises (m−n) modules of the first type (modules 1_n+1 . . . 1_m; 2_n+1 . . . 2_m etc.). The modules of the second type are arranged adjacent to the AC voltage terminal of the phase module. The modules of the first type are arranged adjacent to the first and/or the second DC voltage terminal of the phase module. The modules of the second type in each phase module form in each case one (central) electrical series circuit (at the AC voltage terminal); the modules of the first type in each phase module form in each case two electrical series circuits (a first electrical series circuit at the first DC voltage terminal and a second electrical series circuit at the second DC voltage terminal). In particular, inductances (inductor coils) can be arranged in the phase modules, for example at the AC voltage terminals or at the DC voltage terminals.

A control device 35 for the modules 1_1 to 6_m is illustrated schematically in the left-hand region of FIG. 1. This central control device 35 transmits optical messages or optical signals to the individual modules via an optical communication connection 37 (for example via an optical waveguide). The message transmission between the control device and a module is illustrated in each case symbolically by a line 37; the direction of the message transmission is symbolized by the arrowheads on the lines 37. This is illustrated on the basis of the example of the modules 1_1, 1_(n+1) and 4_2; in the same way, messages are transmitted to the other modules and messages are received from these modules. By way of example, the control device 35 transmits to the individual modules in each case a target value for the switching state of the electronic switching elements.

A voltage limiting device 50 is electrically connected to one of the phase modules 15, 24 or 31. In the exemplary embodiment in FIG. 1, the voltage limiting device 50 is electrically connected to the third phase module 31. The voltage limiting device 50 bridges the modules of the second type of the third phase module 31. To put it another way, the voltage limiting device 50 is connected in parallel with the modules of the second type.

The voltage limiting device 50 comprises a first terminal 53 and a second terminal 56. The first terminal 53 of the voltage limiting device 50 is electrically connected to a connection point 59 (first connection point 59) between the modules of the first type and the modules of the second type of one phase module branch 27 of the phase module 31. The second terminal 56 of the voltage limiting device 50 is electrically connected to a connection point 62 (second connection point 62) between the modules of the first type and the modules of the second type of the other phase module branch 29 of the phase module 31. The voltage limiting device 50 thus bridges the modules of the second type of the third phase module 31.

In the exemplary embodiment, the voltage limiting device 50 is connected between the first connection point 59 and the second connection point 62. This voltage limiting device 50 connects the first connection point 59 and the second connection point 62. The voltage limiting device 50 is thus connected between the first DC voltage terminal 16 and the second DC voltage terminal 17. The voltage limiting device 50 thus limits the voltage of one polarity between the first connection point 59 and the second connection point 62. The voltage limiting device 50 thus also limits the voltage of one polarity between the first DC voltage terminal 16 and the second DC voltage terminal 17.

The voltage limiting device 50 comprises semiconductor valves 65_1, 65_2, 65_3 etc. to 65_p, which are electrically connected in series. In principle, the voltage limiting device 50 would also function with just a single semiconductor valve 65_1. The semiconductor valves 65_1, 65_2, 65_3 . . . 65_p form a total semiconductor valve 65 having a higher reverse voltage than the individual semiconductor valves.

In the exemplary embodiment, p=50, that is to say that 50 semiconductor valves are electrically connected in series. In other exemplary embodiments, however, it is indeed possible for larger numbers of semiconductor valves to be electrically connected in series, for example 100 or 200. If only a low reverse voltage is required, a smaller number of semiconductor valves may also be sufficient.

In the exemplary embodiment, the semiconductor valves 65_1, 65_2, 65_3 . . . 65_p are configured as diodes 65_1, 65_2, 65_3 . . . 65_p. Specifically, in the exemplary embodiment in FIG. 1, p diodes are electrically connected in series and form the total semiconductor valve 65.

The semiconductor valves 65_1, 65_2, 65_3 . . . 65_p form an electrical series circuit with an electrical resistor 68. The resistor 68 can be a linear (ohmic) resistor. However, the resistor 68 can also be a varistor (voltage-dependent resistor), in particular a metal oxide varistor. The resistor 68 can be a surge arrester, in particular. What is achieved by the surge arrester 68 is that the voltage limiting device 50 becomes effective only upon a specific magnitude of the undesired negative voltage. In addition, excess electrical energy can be converted into heat in the resistor 68 or the varistor 68.

In the case of normal operating conditions/normal operation, a positive voltage Udc is present between the first DC voltage terminal 16 and the second DC voltage terminal 17 (that is to say that the electrical potential at the first DC voltage terminal 16 is greater than the electrical potential at the second DC voltage terminal 17).

A positive voltage UVB is then also present between the first connection point 59 and the second connection point 62 (that is to say that the electrical potential at the first connection point 59 is greater than the electrical potential at the second connection point 62). No electric current then flows through the voltage limiting device 50 owing to the valve effect of the semiconductor valves 65_1 . . . 65_p. As a result, the (positive) DC voltage Udc present at the DC voltage terminals 16, 17 is not changed during normal operation.

However, if a singular event or a fault occurs for example in a direct-current transmission link connected to the DC voltage terminals 16, 17, then it can happen that a voltage U of opposite polarity (negative voltage) occurs between the first DC voltage terminal 16 and the second DC voltage terminal 17. Such negative voltages can occur for example on account of undesired oscillations in the direct-current transmission link. In this case, the electrical potential at the first DC voltage terminal 16 is less than the electrical potential at the second DC voltage terminal 17 at least at times. The electrical potential at the first connection point 59 is then also less than the electrical potential at the second connection point 62 at least at times.

A current I then flows from the second DC voltage terminal 17 via the second connection point 62 through the resistor 68 and the semiconductor valves 65_1 . . . 65_p to the first connection point 59 and then to the first DC voltage terminal 16. As a result, the undesired negative voltage U between the two DC voltage terminals 16 and 17 is provided with a load and thereby limited/damped. In the extreme case, the undesired negative voltage U is short-circuited. If the resistor 68 is a surge arrester, then the current I flows through the voltage limiting device 50 only if the negative voltage has a magnitude such that the response voltage of the surge arrester is exceeded.

Depending on the maximum rate of current change of the current I flowing through the voltage limiting device 50, it may be advantageous, if appropriate, to use fast diodes (e.g. IGCT diodes). The semiconductor valves can be selected in particular on the basis of their $i^2t$ value.

Figure 2:
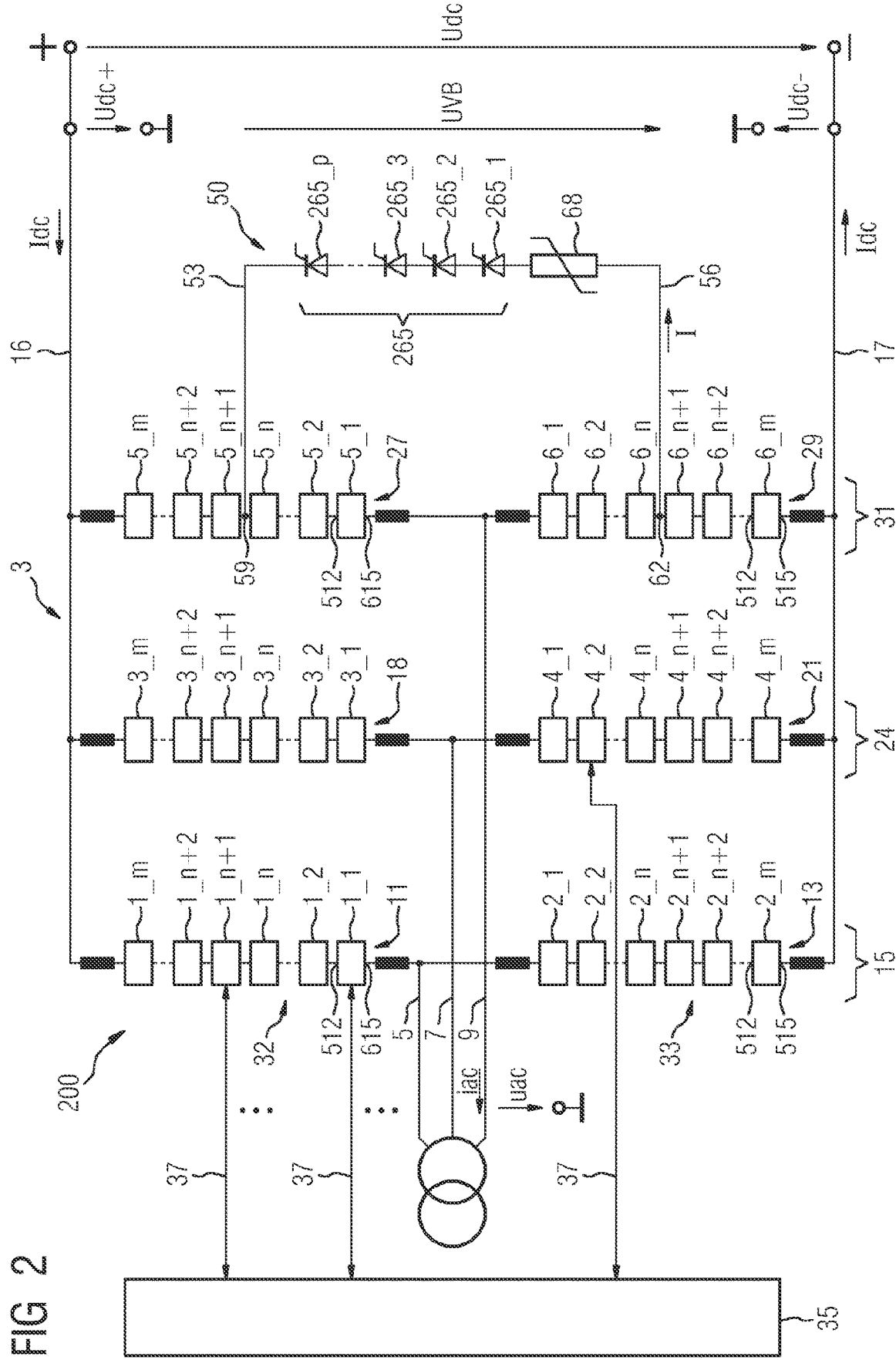
FIGS. 2 and 3 illustrate further exemplary embodiments of a multilevel power converter having a voltage limiting device.

FIG. 2 illustrates a further exemplary embodiment of an assembly 200. This assembly 200 differs from the assembly 1 in FIG. 1 merely in that the semiconductor valves are configured as thyristors 265_1 . . . 265_p. In the event of an undesired negative voltage occurring, said thyristors 265_1 . . . 265_p are driven substantially simultaneously by means of a drive circuit (not illustrated), such that they then assume an on state and enable a current flow I from the second connection point 62 to the first connection point 59 (and thus from the second DC voltage terminal 17 to the first DC voltage terminal 16). In this case, the thyristors can have a parallel-connected snubber comprising an RC element. The diodes illustrated in FIG. 1 can also have such a snubber.

Instead of the thyristors, other semiconductor valves capable of being switched on can also be used, for example transistors.

Figure 3:
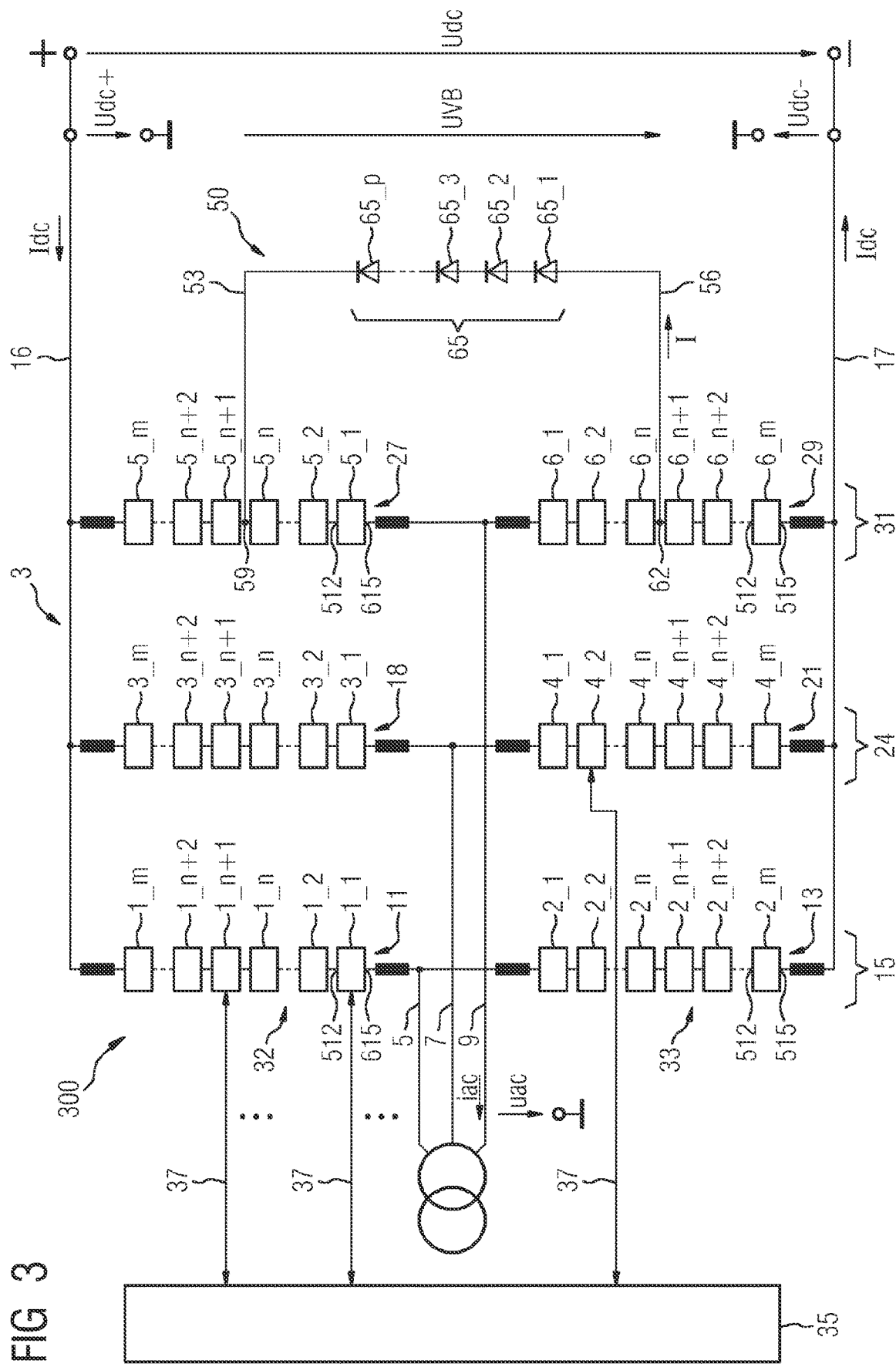

FIG. 3 illustrates a further exemplary embodiment of an assembly 300. This assembly 300 differs from the exemplary embodiment in FIG. 1 merely in that the resistor 68 is omitted. The voltage limiting device 50 thus comprises only the semiconductor valves 65_1 . . . 65_p. In this case, the undesired negative voltage is limited to the sum of the forward voltages of the semiconductor valves 65_1 . . . 65_p. The current I flowing through the voltage limiting device 50 is not limited by the resistor 68, and so the semiconductor valves 65_1 . . . 65_p must be dimensioned sufficiently robustly. The resistor or surge arrester 68 can be omitted in the exemplary embodiment in FIG. 2 as well.

Figure 4:
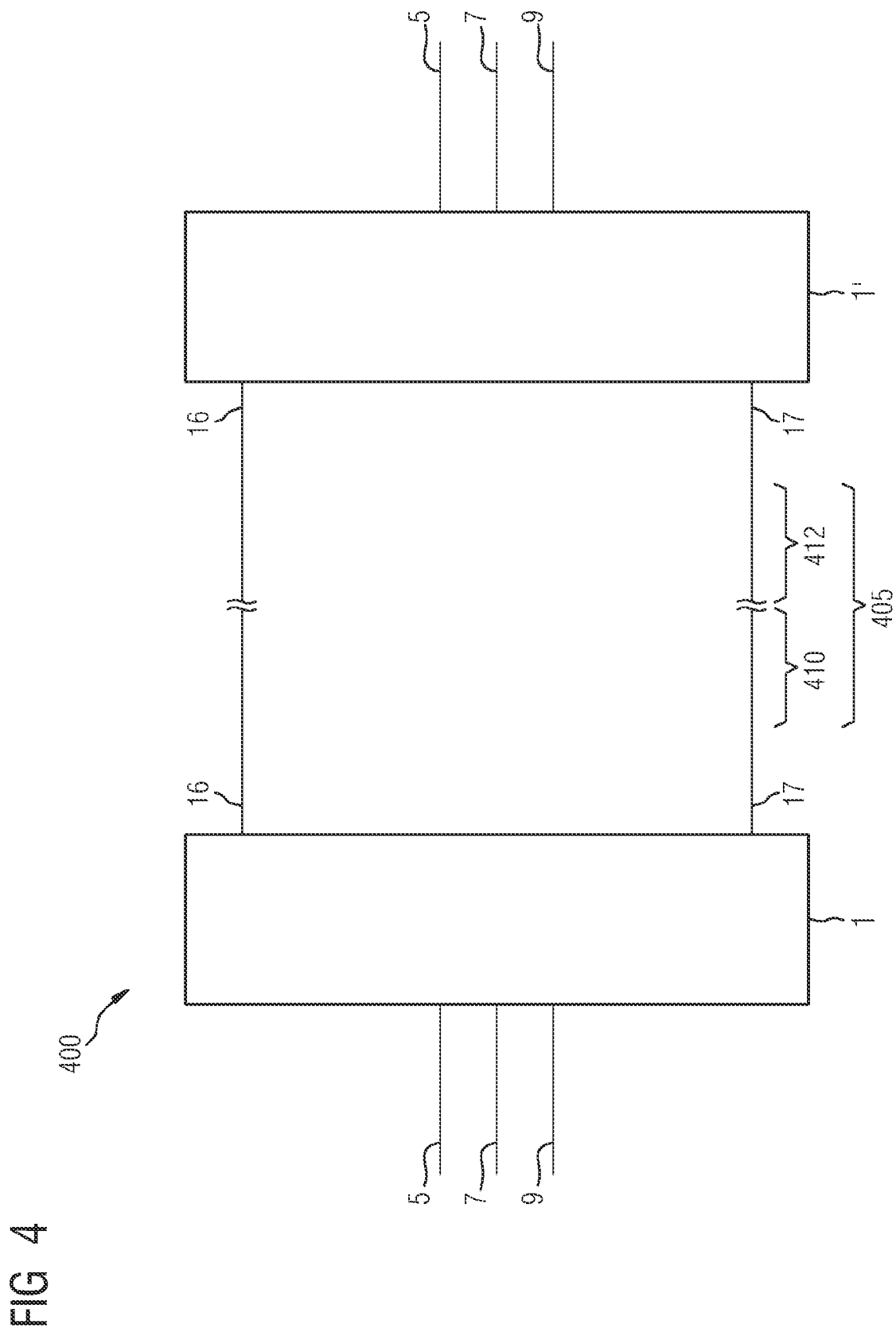
FIG. 4 illustrates one exemplary embodiment of a high-voltage direct-current transmission installation comprising such a multilevel power converter.

FIG. 4 illustrates one exemplary embodiment of a high-voltage direct-current transmission installation 400. This high-voltage direct-current transmission installation 400 comprises an assembly 1 having a multilevel power converter 3 and a voltage limiting device 50 in accordance with FIG. 1 and also a direct-current transmission link 405. In the exemplary embodiment in FIG. 4, the direct-current transmission link 405 comprises two different conductor types: a first part 410 of the direct-current transmission link 405 is configured as an overhead line 410 (first conductor type 410); a second part 412 of the direct-current transmission link 405 is configured as a cable 412 (second conductor type 412), in particular as a plastic-insulated cable 412. The cable 412 can also be some other cable, in particular an oil-insulated cable or a mass-impregnated cable. A further assembly 1' having a further multilevel power converter 3 and an optional further voltage limiting device 50 can be arranged at that end of the direct-current transmission link 405 which is remote from the assembly 1.

The two assemblies 1 and 1' (and thus the two power converters 3) are electrically connected to one another on the DC voltage side via the high-voltage direct-current transmission link 405. Electrical energy can be transmitted over long distances by means of such a high-voltage direct-current transmission installation 400; the high-voltage direct-current transmission link 405 then has a corresponding length. Such a high-voltage direct-current transmission installation can also be a multi-terminal high-voltage direct-current transmission installation.

In the case of the modular multilevel power converter 3 or the further modular multilevel power converter 3, for example, the first DC voltage terminal 16 or the second DC voltage terminal 17 can be grounded (in particular in the case of a bipole configuration). This grounding can be effected directly ("hard grounding") or indirectly via an arrester or an impedance, for example. Alternatively, the first DC voltage terminal and the second DC voltage terminal can be ungrounded (particularly in the case of a symmetric monopole configuration); the grounding is then effected on the AC voltage side of the multilevel power converter. A star point of the AC power supply system can be grounded; in particular a star part of an AC voltage-side transformer or an additionally created high-impedance star point ("artificial" star point").

FIG. 5 illustrates one exemplary embodiment of a module 500 of the modular multilevel power converter 3. The module 500 is a "module of the first type". The module 500 can be, for example, one of the modules 1_(n+1) . . . 1_m to 5_(n+1) . . . 5_m and/or 6_(n+1) . . . 6_m illustrated in FIG. 1.

The module 500 is configured as a half-bridge module 500. The module 500 comprises a first (turn-off) electronic switching element 502 (first turn-off semiconductor valve 502) with a first diode 504 connected in antiparallel. Furthermore, the module 500 comprises a second (turn-off) electronic switching element 506 (second turn-off semiconductor valve 506) with a second diode 508 connected in antiparallel, and also an electrical energy store 510 in the form of a capacitor 510. The first electronic switching element 502 and the second electronic switching element 506 are each configured as an IGBT (insulated-gate bipolar transistor). The first electronic switching element 502 is electrically connected in series with the second electronic switching element 506. A first module terminal 512 is arranged at the connection point between the two electronic switching elements 502 and 506. A second module terminal 515 is arranged at the opposite terminal of the second electronic switching element 506 with respect to the connection point. The second module terminal 515 is further electrically connected to a first terminal of the energy store 510; a second terminal of the energy store 510 is electrically connected to the opposite terminal of the first electronic switching element 502 with respect to the connection point.

The energy store 510 is thus electrically connected in parallel with the series circuit formed by the first electronic switching element 502 and the second electronic switching element 506. What can be achieved by corresponding driving of the first electronic switching element 502 and of the second electronic switching element 506 by a control device of the power converter is that between the first module terminal 512 and the second module terminal 515 either the voltage of the energy store 510 is output or no voltage is output (i.e. a zero voltage is output). The module of the first type 500 is thus able to output either a voltage of exclusively one polarity or the voltage zero (zero voltage) between the first module terminal 512 and the second module terminal 515. The respectively desired output voltage of the power converter can thus be generated by way of the interaction of the modules of the individual phase module branches. The energy store can be one capacitor (or an interconnection of a plurality of capacitors); the voltage of the energy store is then the capacitor voltage (or the total voltage of the interconnection).

Optionally, an additional semiconductor valve 520 can be connected between the first module terminal 512 and the second module terminal 515. Said additional semiconductor valve 520 can be a bridging switching element 520. In response to driving, the bridging switching element 520 bridges the module 500. In the exemplary embodiment, the bridging switching element 520 is configured as a thyristor 520, that is to say as a bridging switching element 520 capable of being switched on. In the exemplary embodiment, the bridging switching element 520 is connected such that (in the switched-on state) it can carry a current which flows in the same direction as and in parallel with the current flowing through the diode 508 (second diode 508 connected in antiparallel). As a result, the loading on the diode 508 is relieved in the case where a negative voltage to be limited occurs. In this case, therefore, the bridging switching element 520 is to be switched on/closed; in the exemplary embodiment, therefore, the thyristor 520 is switched on/triggered when a negative voltage to be limited occurs. In the case of a DC fault, the active switching-on/connecting of the bridging switching element 520 may thus be advantageous. As an alternative to the bridging switching element 520, the second diode 508 connected in antiparallel can also be embodied corresponding robustly and/or the second diode 508 connected in antiparallel can be reinforced by means of one or more further diodes connected in parallel (for example press-pack diodes). In this case, therefore, the additional semiconductor valve 520 is at least one diode. However, the additional semiconductor valve 520 can also be configured differently, for example as an IGCT or a GTO. The additional semiconductor valve 520 is connected in the same direction in parallel with the second diode 508 connected in antiparallel, or is connected in antiparallel with the second electronic switching element 506.

FIG. 6 illustrates a further exemplary embodiment of a module 600 of the modular multilevel power converter 3. The module 600 is a "module of the second type". The module 600 can be, for example, one of the modules 1_1 ... 1_n, 2_1 ... 2_n to 6_1 ... 6_n illustrated in FIG. 1.

Besides the first electronic switching element 502, second electronic switching element 506, first freewheeling diode 504, second freewheeling diode 508 and energy store 510 known from FIG. 5, the module 600 illustrated in FIG. 6 comprises a third electronic switching element 602 with a third freewheeling diode 604 connected in antiparallel, and also a fourth electronic switching element 606 with a fourth freewheeling diode 608 connected in antiparallel. The third electronic switching element 602 and the fourth electronic switching element 606 are each configured as an IGBT. In contrast to the circuit in FIG. 5, the second module terminal 615 is not electrically connected to the second electronic switching element 506, but rather to a center point (connection point) of an electrical series circuit formed by the third electronic switching element 602 and the fourth electronic switching element 606.

The module in FIG. 6 is a so-called full-bridge module 600. This full-bridge module 600 is distinguished by the fact that upon corresponding driving of the four electronic switching elements, between the first module terminal 512 and the second module terminal 615, optionally either the positive voltage of the energy store 510, the negative voltage of the energy store 510 or a voltage of value zero (zero voltage) can be output. Consequently, the polarity of the output voltage can thus be reversed by means of the module of the second type 600. The module of the second type 600 is thus able to output a voltage of one polarity, a voltage of opposite polarity or zero voltage between its first electrical module terminal 512 and its second electrical module terminal 615.

FIG. 7 illustrates a further exemplary embodiment of an assembly 700. This assembly 700 differs from the assembly 1 in FIG. 1 merely in that the voltage limiting device 50 comprises a first series circuit 704 formed by the semiconductor valves 65_1, 65_2, ... 65_p and the electrical resistor 68 and a second series circuit 708 formed by semiconductor valves 764_1, 764_2, ... 764_p and an electrical resistor 768. A first terminal of the first series circuit 704 is connected to the second connection point 62. A second terminal of the first series circuit 704 is connected to a first terminal of the second series circuit 708. A second terminal of the second series circuit 708 is connected to the first connection point 59. The connection location/connection point 712 (center connection point 712) between the first series circuit 704 and the second series circuit 708 is grounded. This assembly 700 is advantageously usable particularly in the case of a symmetric monopole configuration of a high-voltage direct-current transmission installation.

In the figures, the voltage limiting device 50 is arranged by way of example at the third phase module 31. In other exemplary embodiments, however, the voltage limiting device 50 can also be arranged at a different phase module. In yet another exemplary embodiment, the voltage limiting device 50 can also be optionally (switchably) connectable to different phase modules. However, it is also possible for a dedicated voltage limiting device in each case to be assigned (fixedly) to one, a plurality or all of the phase modules.

The assembly described and the method described have a number of advantages. The voltage that occurs across the modules of the second type of a phase module (that is to say the voltage that occurs between the first connection point 59 and the second connection point 62) can be limited or damped in a polarity-dependent manner. As a result, the voltage that occurs between the first DC voltage terminal 16 and the second DC voltage terminal 17 is also limited or damped in a polarity-dependent manner.

This avoids having to equip the multilevel power converter with additional modules in order to take up the negative voltage. As a result, it is possible to realize cost advantages for the multilevel power converter. This is advantageous in particular in the case of multilevel power converters which comprise modules which can provide only a voltage of one polarity (for example half-bridge modules) and also modules which can provide voltages of both polarities (for example full-bridge modules). In the case of such power converters, the number of full-bridge modules can be kept small, in particular, which results in cost advantages. Specifically, such full-bridge modules would be necessary in order to provide the negative voltages that occur in the case of a fault. To put it another way, the power converter is advantageously decoupled from the direct-current transmission link by the voltage limiting device.

In the case of the assembly described, the polarity-dependent voltage limiting device is connected in parallel with the modules of the second type (and thus indirectly between the DC voltage terminals of the multilevel power converter), said device carrying out polarity-dependent voltage limiting. As a result, the maximum value of the (undesired) negative voltage is limited, whereby the multilevel power converter is protected. An overdimensioning of the multilevel power converter (by additional modules) is advantageously avoided. Such a polarity-dependent voltage limiting device can be realized in particular as a series circuit formed by semiconductor valves and an electrical resistor (in particular a surge arrester). Optionally, the surge arrester can also be omitted, however, such that exclusively a series circuit formed by semiconductor valves is used. The voltage limiting device 50 may also be referred to as a voltage-asymmetric voltage limiting device or as a voltage-asymmetric arrester, in particular suitable for high-voltage direct-current transmissions using mixed direct-current transmission links. In the case of such mixed direct-current transmission links, undesired high negative voltages can arise for example as a result of reflections between the different conductor types (in particular as a result of reflections between an overhead line and a cable). The polarity-dependent voltage limiting device can be used advantageously precisely in the case of a cable, since cables are sensitive vis-à-vis a sudden voltage reversal.

The voltage limiting device 50 could also be connected directly between the first DC voltage terminal 16 and the second DC voltage terminal 17. The voltage limiting device 50 could thus be connected directly between the DC voltage-side power converter terminals. Such an assembly is described in the international patent application having the application number PCT/EP2019/051251. However, in this case, the DC voltage that occurs at the power converter (that is to say the nominal voltage of the direct-current link) determines the voltage loading of the voltage limiting device 50 and thus the number of semiconductor valves of the voltage limiting device 50 that are to be connected in series. Hundreds of semiconductor valves may indeed be required in this case in order to achieve the required dielectric strength.

By contrast, the solution described here has the advantage that fewer semiconductor valves to be connected in series are required in the voltage limiting device 50. The reason for this is that the second antiparallel-connected diode 508 (or the bridging switching element 520 or the diodes (load-relieving diodes) connected in parallel with the second antiparallel-connected diode 508) present in the modules of the first type can in each case take up part of the voltage. A portion of the components of the modules of the first type can thus be used a number of times: firstly for the customary use in the module of the first type and secondly for the voltage load relieving of the voltage limiting device 50. These components of the modules of the first type can thus realize part of the functionality of the voltage limiting device 50 (in particular provide blocking voltage).

The number of semiconductor valves of the voltage limiting device 50 that are to be connected in series can therefore be reduced in practice in particular by approximately 15%, even by a proportion higher still under specific boundary conditions. Depending on the degree of modulation of the power converter and on the ratio of the number of modules of the first type to the modules of the second type, the DC voltage loading of the semiconductor valves of the voltage limiting device 50 can be reduced to values of between 32% and 55%, for example, which enables an even greater reduction of the number of semiconductor valves of the voltage limiting device 50 that are to be connected in series. (In the case of the power converter, the degree of modulation describes the ratio between the magnitude of the AC voltage (in particular the amplitude ûac of the AC voltage) and the magnitude of the DC voltage Udc. By way of example, M=2ûac/Udc may hold true for the degree of modulation M.)

This results in significant cost advantages. The smaller number of required semiconductor valves opens up the possibility for further optimizations. In particular, the power converter can be designed optimally with regard to the total costs; the economic viability of the power converter can be significantly improved.

A description has been given of an assembly and a method which enable polarity-dependent voltage limiting to be carried out for a multilevel power converter.

The invention claimed is:

1. An assembly having a multilevel power converter, comprising:
    at least one phase module having a plurality of modules, each with a first electrical module terminal and a second electrical module terminal;
    said plurality of modules including modules of a first type, which are configured to output a voltage of exclusively one polarity or zero voltage at said first electrical module terminal and said second electrical module terminal thereof;
    said plurality of modules including modules of a second type, which are configured to output a voltage of one polarity, a voltage of opposite polarity, or zero voltage at said first electrical module terminal and said second electrical module terminal thereof; and
    a voltage limiting device connected to said at least one phase module and configured to limit a voltage occurring across said modules of the second type depending on the polarity of said voltage; and wherein:
    said at least one phase module comprises an AC voltage terminal, a first DC voltage terminal, and a second DC voltage terminal;
    said first DC voltage terminal and said second DC voltage terminal are connected to a direct-current transmission link; and
    said direct-current transmission link includes two different conductor types that differ from each other with regard to a capacitance per unit length thereof.

2. The assembly according to claim 1, wherein said at least one phase module comprises an AC voltage terminal, a first DC voltage terminal, and a second DC voltage terminal.

3. The assembly according to claim 2, wherein said modules of the second type are arranged adjacent said AC voltage terminal of said at least one phase module, and said modules of the first type are arranged adjacent said first DC voltage terminal and/or said second DC voltage terminal of said at least one phase module.

4. The assembly according to claim 1, wherein each of said plurality of modules comprises at least one first electronic switching element, a second electronic switching element, and an electrical energy storage device.

5. The assembly according to claim 4, wherein each of said modules of the first type comprises said first electronic switching element and said second electronic switching element connected in a half-bridge circuit.

6. The assembly according to claim 4, wherein said modules of the first type comprise an additional semiconductor valve selected from the group consisting of a diode, a thyristor, an IGCT, and a GTO connected in parallel with said second electronic switching element.

7. The assembly according to claim 4, wherein each of said modules of the second type comprises said first electronic switching element, said second electronic switching element, a third electronic switching element, and a fourth electronic switching element connected in a full-bridge circuit.

8. The assembly according to claim 1, wherein said voltage limiting device is configured limit only a voltage of one polarity that occurs across said modules of the second type, and to leave substantially unchanged the voltage of the opposite polarity that occurs across said modules of the second type.

9. The assembly according to claim 1, wherein said voltage limiting device is configured to conduct a current through said voltage limiting device only when the voltage of the one polarity occurs across said modules of the second type.

10. The assembly according to claim 1, wherein said voltage limiting device comprises at least one semiconductor valve.

11. The assembly according to claim 10, wherein said voltage limiting device comprises at least 50 semiconductor valves connected in a series circuit of semiconductor valves.

12. The assembly according to claim 10, wherein said at least one semiconductor valve is selected from the group consisting of a diode, a thyristor, an IGCT, a GTO, and a transistor.

13. The assembly according to claim 10, further comprising an electrical resistor connected in series with said at least one semiconductor valve.

14. The assembly according to claim 13, wherein said electrical resistor is a varistor.

15. The assembly according to claim 1, wherein said different conductor types are selected from the group consisting of an overhead line, a cable, and a gas-insulated line.

16. The assembly according to claim 15, wherein said cable is selected from the group consisting of a plastic-insulated cable, an oil-insulated cable, and a mass-impregnated cable.

17. The assembly according to claim 1, wherein said multilevel power converter comprises a plurality of two or three said phase modules, and wherein said voltage limiting device is switchable between said phase modules or a dedicated said voltage limiting device is respectively assigned to each of said phase modules.

18. A high-voltage direct-current transmission installation, comprising an assembly according to claim 1.

19. A method for polarity-dependent limiting of a voltage in a multilevel power converter with at least one phase module, the method comprising:
providing the phase module with a plurality of modules each including a first electrical module terminal and a second electrical module terminal;
wherein the plurality of modules include:
modules of a first type, which are capable of outputting a voltage of exclusively one polarity or zero voltage at their first electrical module terminal and their second electrical module terminal; and
modules of a second type, which are capable of outputting a voltage of one polarity, a voltage of opposite polarity, or zero voltage at their first electrical module terminal and their second electrical module terminal; and
wherein the at least one phase module includes:
an AC voltage terminal, a first DC voltage terminal, and a second DC voltage terminal;
the first DC voltage terminal and the second DC voltage terminal are connected to a direct-current transmission link; and
the direct-current transmission link includes two different conductor types that differ from each other with regard to a capacitance per unit length thereof; and
limiting, by a voltage limiting device, only a voltage of one polarity that occurs across the modules of the second type leaving substantially unchanged a voltage of the opposite polarity that occurs across the modules of the second type.

20. The method according to claim 19, which comprises only when the voltage of the one polarity occurs across the modules of the second type flowing a current through the voltage limiting device and thereby limiting the voltage of the one polarity.

21. The method according to claim 19, which comprises:
providing each of the modules of the first type with a first electronic switching element and a second electronic switching element connected in a half-bridge circuit;
providing an additional semiconductor valve connected in parallel with the second electronic switching element; and
conducting a part of the current flowing through the modules of the first type through the additional semiconductor valve only when the voltage of the one polarity occurs across the modules of the second type.

* * * * *